US011320156B2

(12) United States Patent
Gong

(10) Patent No.: US 11,320,156 B2
(45) Date of Patent: May 3, 2022

(54) AIR PURIFIER

(71) Applicant: ZHEJIANG SHAOXING SUPOR DOMESTIC ELECTRICAL APPLIANCE CO., LTD, Zhejiang (CN)

(72) Inventor: Mengyang Gong, Zhejiang (CN)

(73) Assignee: ZHEJIANG SHAOXING SUPOR DOMESTIC ELECTRICAL APPLIANCE CO., LTD ( * ) Notice: Subject to any disclaimer, the term of this patent is extended or adjusted under 35 U.S.C. 154(b) by 0 days.

(21) Appl. No.: 17/275,937

(22) PCT Filed: Apr. 15, 2019

(86) PCT No.: PCT/CN2019/082639
§ 371 (c)(1),
(2) Date: Mar. 12, 2021

(87) PCT Pub. No.: WO2020/062838
PCT Pub. Date: Apr. 2, 2020

(65) Prior Publication Data
US 2021/0325057 A1    Oct. 21, 2021

(30) Foreign Application Priority Data

Sep. 30, 2018  (CN) ........................ 201821612353.7
Nov. 2, 2018   (CN) ........................ 201821801185.6

(51) Int. Cl.
*B01D 46/00*  (2006.01)
*B01D 46/24*  (2006.01)
(Continued)

(52) U.S. Cl.
CPC ............ *F24F 3/16* (2013.01); *B01D 46/0004* (2013.01); *B01D 46/2411* (2013.01); *F24F 8/10* (2021.01);
(Continued)

(58) Field of Classification Search
CPC ............ B01D 46/0004; B01D 46/2411; B01D 2265/027; B01D 2273/30; B01D 2279/50;
(Continued)

(56) References Cited

U.S. PATENT DOCUMENTS 6,855,190 B1 *  2/2005  Nikkhah ................. B03C 3/743
                                              95/76
8,910,821 B1 * 12/2014  Stravitz ................. B65F 1/1415
                                              220/495.08
(Continued)

FOREIGN PATENT DOCUMENTS

CN    201643907 U    11/2010
CN    202398232 U     8/2012
(Continued)

OTHER PUBLICATIONS

Search Report for European Application No. 19864413 dated Oct. 6, 2021. 2 pgs.
(Continued)

*Primary Examiner* — Minh Chau T Pham
(74) *Attorney, Agent, or Firm* — Lerner, David, Littenberg, Krumholz & Mentlik, LLP

(57) ABSTRACT

An air purifier comprising a main unit, a base assembly below the main unit, a filter screen assembly inside the main unit and an air supply device above the filter screen assembly, wherein the base assembly comprises a carrier part on which the filter screen assembly is provided and a lifting part that is located below the carrier part and abuts the carrier part. The lifting part comprises a pull-push part and a lifting assembly configured such that when the pull-push part makes a translation in a first direction, the lifting assembly controls the carrier part to descend and separate the filter screen assembly from the air supply device, and when the pull-push part makes a translation in a second direction opposite the first direction, the lifting assembly controls the
(Continued)

carrier part to rise and achieve a sealed connection between the filter screen assembly and the air supply device.

15 Claims, 13 Drawing Sheets

(51) Int. Cl.
*F24F 3/16* (2021.01)
*F24F 8/10* (2021.01)

(52) U.S. Cl.
CPC .... *B01D 2265/027* (2013.01); *B01D 2273/30* (2013.01); *B01D 2279/50* (2013.01)

(58) Field of Classification Search
CPC ........ F24F 1/00; F24F 3/16; F24F 8/10; F24F 13/28; F24F 3/1603; F24F 2003/1614
See application file for complete search history.

(56) References Cited

U.S. PATENT DOCUMENTS

| | | | | |
|---|---|---|---|---|
| 2006/0037172 A1* | 2/2006 | Choi | ................ | A47L 9/1666 |
| | | | | 15/353 |
| 2008/0066435 A1 | 3/2008 | Engel et al. | | |
| 2015/0113925 A1* | 4/2015 | Gatica | ................ | B01D 35/30 |
| | | | | 55/357 |
| 2019/0382281 A1* | 12/2019 | Moon | ................ | B67D 1/0042 |
| 2020/0298161 A1* | 9/2020 | Jeon | ................ | B01D 46/12 |
| 2020/0298165 A1* | 9/2020 | Kang | ................ | B01D 46/0043 |
| 2020/0300502 A1* | 9/2020 | Kang | ................ | F24F 13/20 |
| 2021/0123605 A1* | 4/2021 | Heo | ................ | F24C 15/2042 |

FOREIGN PATENT DOCUMENTS

| | | | | |
|---|---|---|---|---|
| CN | 106422551 A | | 2/2017 | |
| CN | 108043123 A | | 5/2018 | |
| CN | 108662742 A | * | 10/2018 | ............ F24F 13/28 |
| CN | 208154765 U | * | 11/2018 | ............ F24F 13/28 |
| CN | 210035793 U | * | 2/2020 | ............ F24F 13/28 |
| EP | 3211336 A1 | | 8/2017 | |
| JP | 2001038122 A | | 2/2001 | |
| JP | 2014018790 A | | 2/2014 | |
| KR | 101530186 B1 | | 6/2015 | |

OTHER PUBLICATIONS

International Search Report for Application No. PCT/CN2019/082639 dated Jul. 9, 2019.

* cited by examiner

AIR PURIFIER

CROSS-REFERENCE TO RELATED APPLICATIONS

The present application is a national phase entry under 35 U.S.C. § 371 of International Application No. PCT/CN2019/082639 filed Apr. 15, 2019, which claims priority from Chinese Application Nos. 201821801185.6, filed Nov. 2, 2018, and 201821612353.7, filed Sep. 30, 2018, all of which are hereby incorporated herein by reference.

FIELD

The present disclosure relates to the technical field of electric home appliances, and more particularly, an air purifier.

BACKGROUND

As air pollution is becoming more and more serious, requirements for interior air quality are becoming higher and higher. An air purifier can remove suspended particulate matter in the air so as to provide relatively clean air to people.

Currently, an air purifier filters and purifies air mainly through a filter screen. Specifically, air is sucked in by a fan in the air purifier, passes a filter screen that absorbs suspended particulate matter, and, after the purification, is discharged. The sealing effect of the filter screen and the air inlet of the fan directly affects filtering efficiency. As time goes by, the filter screen becomes dirtier and dirtier with the accumulation of dust, unable to achieve the goal of purifying air. This requires a user to replace the filter screen regularly. In order to be able to replace the filter screen, the filter screens in the prior art are dismountable.

However, the sealing of a filter screen that is easy to dismount with the air inlet of a fan is relatively poor, while the dismounting of a filter screen that has good sealing with the air inlet of a fan is complicated, providing poor user experience.

SUMMARY

Embodiments of the present disclosure provide an air purifier that not only ensures the sealing of the air inlet line, but also permits easy mounting and dismounting of the filter screen.

The present disclosure provides an air purifier comprising a main unit, a base assembly provided below the main unit, a filter screen assembly provided inside the main unit and an air supply device provided above the filter screen assembly, wherein the base assembly comprises a carrier part on which the filter screen assembly is provided and a lifting part that is located below the carrier part and abuts the carrier part, the lifting part comprises a pull-push part and a lifting assembly which are configured such that when the pull-push part makes a translation in a first direction, the lifting assembly controls the carrier part to descend so as to separate the filter screen assembly from the air supply device, and when the pull-push part makes a translation in a second direction opposite to the first direction, the lifting assembly controls the carrier part to rise so as to achieve a sealed connection between the filter screen assembly and the air supply device.

Since the translation of the pull-push part is transformed into the vertical up-and-down movement of the lifting part which drives the carrier part to move vertically up and down, the rising and descending of the filter screen assembly are achieved easily and the force required for such an operation is reduced. Specifically, when the lifting part controls the carrier part to descend so as to separate the filter screen assembly from the air supply device, the replacement of the filter screen assembly by a user is facilitated. When the lifting part controls the carrier part to rise so as to achieve a sealed connection between the filter screen assembly and the air supply device, the sealing quality and the purification efficiency are improved.

In some embodiments, the lifting assembly is a screw lifting assembly that engages with the pull-push part, the screw lifting assembly and the pull-push part being configured such that when the pull-push part is pulled outwards, the screw lifting assembly controls the carrier part to descend;

when the pull-push part is pushed inwards, the screw lifting assembly controls the carrier part to rise.

In some embodiments, the screw lifting assembly comprises a gear that engages with the pull-push part and a screw that is provided inside the gear and engages with the gear;

wherein a screw limiting stopper is provided on a bottom of the carrier part, inside the screw;

when the pull-push part is pulled outwards, the screw moves downwards so as to make the carrier part descend;

when the pull-push part is pushed inwards, the screw moves upwards so as to make the carrier part rise.

During the course of movement of the pull-push part, the rotation of the gear drives the screw to move in a synchronized manner under the action of inner threads. Thanks to the screw limiting stopper provided on the bottom of the carrier part and inside the screw, the rotation movement of the screw is limited such that the screw can only move vertically up and down.

In some embodiments, the base assembly further comprises an inner cover on which the pull-push part and the screw lifting assembly are provided.

In some embodiments, a snap and a positioning column are further provided on the inner cover;

wherein a limiting slot inside which the snap is engaged by snapping is provided on the pull-push part; and wherein a positioning column around an outside of which the gear is provided is further provided on the inner cover.

Thanks to the snap and the limiting slot which is movable along the snap, the separation of the pull-push part from the gear during the course of movement is prevented, and the position of the pull-push part when the filter screen assembly is mounted in position can be located, thus facilitating the installation by a user.

Thanks to the positioning column, during the course of movement of the pull-push part, the gear is driven to rotate around a center of the positioning column. In other words, the positioning column performs the function of positioning the gear and preventing the gear from changing its position.

In some embodiments, the lifting assembly is a connecting rod assembly an end of which is connected with the carrier part, and the other end of which is connected with the pull-push part, the connecting rod assembly and the pull-push part being configured such that when the pull-push part is pulled outwards, the connecting rod assembly controls the carrier part to descend;

when the pull-push part is pushed inwards, the connecting rod assembly controls the carrier part to rise.

In some embodiments, the connecting rod assembly comprises a connecting rod, an upper positioning pin and a lower positioning pin;

wherein a bottom of the carrier part is provided with an upper positioning pin slot, and a top of the pull-push part is provided with a lower positioning pin slot;

wherein the upper positioning pin traverses one end of the connecting rod and is provided inside the upper positioning pin slot; and wherein the lower positioning pin traverses the other end of the connecting rod and is provided inside the lower positioning pin slot.

In some embodiments, one end of the connecting rod is provided with a circular through hole inside which the upper positioning pin is provided, and the other end of the connecting rod is provided with an elongated through hole inside which the lower positioning pin is provided;

when the pull-push part is pulled outwards, it drives the lower positioning pin to move to an end of the elongated through hole that is close to the pull-push part, causing the carrier part to descend;

when the pull-push part is pushed inwards, it drives the lower positioning pin to move to an end of the elongated through hole that is far away from the pull-push part, causing the carrier part to rise.

When the pull-push part is pulled outwards, it drives the lower positioning pin to move outwards to the end of the elongated through hole of the connecting rod that is close to the pull-push part. The connecting rod rotates around the upper positioning pin, and the angle between the connecting rod and the pull-push part gradually decreases, causing the carrier part to descend, thus achieving the separation of the filter assembly from the air supply device. When the pull-push part is pushed inwards, it drives the lower positioning pin to move inwards to the end of the elongated through hole of the connecting rod that is far away from the pull-push part. The connecting rod rotates around the upper positioning pin, and the angle between the connecting rod and the pull-push part gradually increases, causing the carrier part to rise, achieving the sealed connection between the filter assembly and the air supply device.

In some embodiments, the connecting rod assembly further comprises a fixing block on which a notch is provided, wherein the fixing block covers the upper positioning pin slot, and the connecting rod is provided inside the notch.

The notch guides the movement of the connecting rod, which is inside the notch when moving, thus preventing the overall deviation of the position of the connecting rod.

In some embodiments, the base assembly further comprises: an inner cover on which a sliding slot is provided, wherein the pull-push part is provided on the inner cover and a bottom of the pull-push part is provided with a thread stud that traverses the sliding lot to be connected with a sliding plate, wherein the thread stud is slidable inside the sliding slot.

Thanks to the thread stud and the sliding slot which are configured such that when the thread stud is stuck at an outer wall of the sliding slot, the pull-push part can no longer be pulled out, damages caused to the base assembly by blind pulling are prevented.

In some embodiments, a limiting rib is provided on a side wall of the pull-push part and a limiting snap is provided on the inner cover. When the pull-push part is pushed inwards to a point where the limiting rib engages in the limiting snap by snapping, the carrier part finishes its rising.

Thanks to the limiting snap and the limiting rib, the position of the pull-push part when the filter assembly is mounted in its position can be located, thus facilitating the installation by a user.

In some embodiments, a pull-push guiding part is provided on the inner cover and the pull-push part comprises a pull-push body and a handle that is located inside the pull-push guiding part and moveable along the pull-push guiding part.

Thanks to the pull-push guiding part along which the pull-push part can move, the problem of unease in operation caused by left-to-right swinging of the pull-push part is avoided.

In some embodiments, the base assembly further comprises a base upper cover that has an opening with a flange, wherein a bottom end of the carrier part is provided with a turn-up which is configured to abut the flange. When the filter screen assembly is sealingly connected with the air supply device, the carrier part protrudes through the opening. When the filter screen assembly is separated from the air supply device, a top of the carrier part is located in the same plan as that of the base upper cover.

When the carrier part has risen to a certain height, the turn-up abuts the flange, thus preventing the carrier part from swinging or separating from the screw lifting assembly during the course of utilization.

In some embodiments, a handle passage hole through which at least part of the pull-push part protrudes is provided on the base upper cover.

The fact that at least part of the pull-push part protrudes through the handle passage hole allows to expose the pull-push part to the exterior, facilitating its operation by a user.

In some embodiments, the main unit comprises a side door panel assembly and a rear door panel assembly, the filter screen assembly being provided inside a cavity enclosed by the side door panel assembly and the rear door panel assembly which are connected in a dismountable manner, a user operable portion of the pull-push part being provided at the side of the rear door panel assembly.

The configuration of the present disclosure and its other objectives and beneficial effects will become clearer through the description of preferred embodiments in reference to the accompanying drawings.

Figure 1:
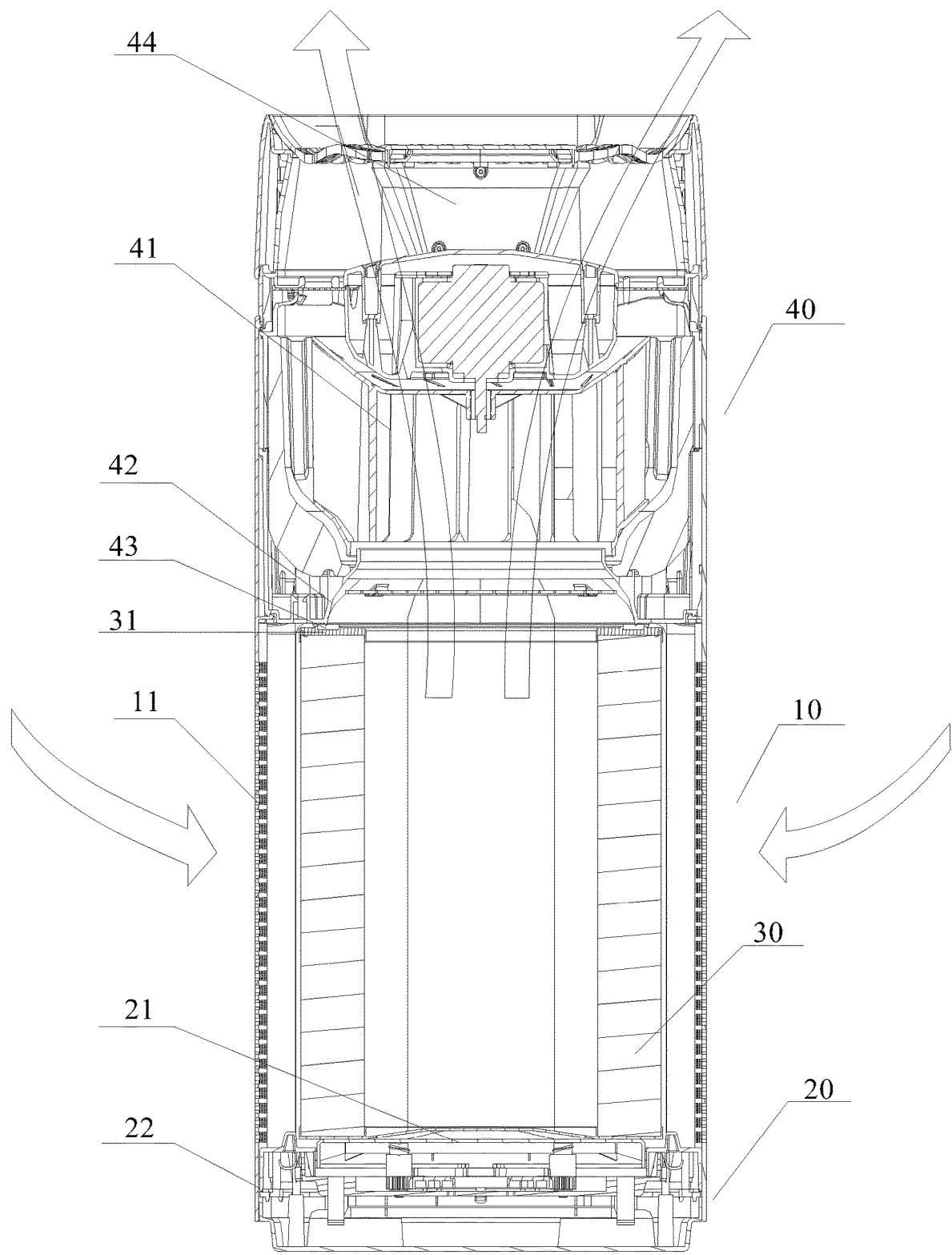
FIG. 1 is an overall schematic sectional view of an air purifier according to the first embodiment of the present disclosure.

| Description of References: | |
|---|---|
| 10-main unit; | 11-side door panel assembly; |
| 12-rear door panel assembly; | 20-base assembly; |
| 21-carrier part; | 211-screw limiting stopper; |
| 212-turn-up; | 22-lifting part; |
| 221-pull-push part; | 222-screw lifting assembly; |
| 223-gear; | 224-screw; |
| 225-pull-push body; | 226-handle; |
| 227-limiting slot; | 23-inner cover; |
| 231-pull-push guiding part; | 232-snap; |
| 233-positioning column; | 24-base upper cover; |
| 241-opening; | 242-flange; |
| 243-filter screen limiting stopper; | 244-handle passage hole; |
| 25-base lower cover; | 30-filter screen assembly; |
| 31-sealing sponge; | 40-air supply device; |
| 41-fan; | 42-fan air inlet; |
| 43-sealing rib; | 44-fan air outlet |
| 22'-lifting part; | 211'-upper positioning pin slot; |
| 222'-connecting rod assembly; | |
| 2221'-connecting rod; | 22211'-circular through hole; |
| 22212'-elongated through hole; | 2222'-upper positioning pin; |
| 2223'-lower positioning pin; | 2224'-fixing block; |
| 22241'-notch; | 221'-pull-push part; |
| 227'-lower positioning pin slot; | 228'-thread stud; |
| 229'-limiting rib; | 225'-pull-push body; |
| 226'-handle; | 23'-inner cover; |
| 234'-sliding slot; | 232'-limiting snap; |
| 233'-sliding plate; | 231'-pull-push guiding part; |
| 24'-base upper cover; | 241'-opening; |
| 242'-flange; | 244'-handle passage hole; |
| 243'-filter screen limiting stopper; | 25'-base lower cover; |

DETAILED DESCRIPTION OF THE EMBODIMENTS

The technical solution of the present disclosure is described in detail below with reference to particular embodiments. The particular embodiments below can be combined with each other. The reference numerals or processes of the same or similar concepts or structures may not be described repeatedly in certain embodiments.

Figure 9:
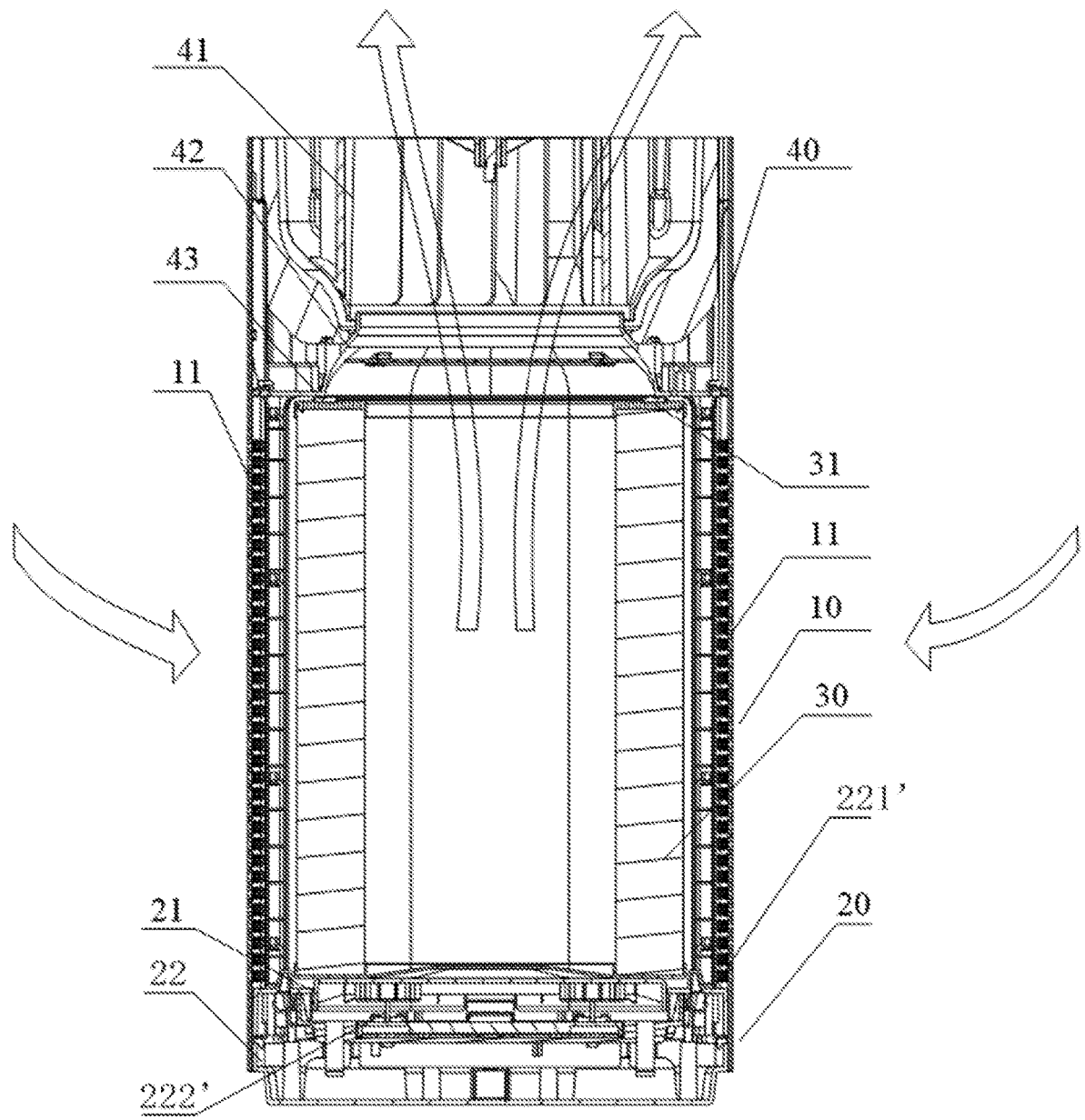
FIG. 9 is an overall schematic sectional view of an air purifier according to the second embodiment of the present disclosure.

FIGS. 1 and 9 are an overall schematic sectional view of an air purifier according to the first and the send embodiments of the present disclosure. As shown in FIGS. 1 and 9, the air purifier comprises: a main unit 10, a base assembly 20 provided below the main unit 10, a filter screen assembly 30 provided inside the main unit 10, and an air supply device 40 provided above the filter screen assembly 30.

The air supply device 40 comprises a fan 41, a fan air inlet 42 sealingly connected with the top of the filter screen assembly 30, and a fan air outlet 44 (not shown in FIG. 9). The fan 41 can comprise a impeller and an electric motor that can drive the impeller to rotate.

The filter screen assembly 30 is a cylinder-shaped filter screen assembly that can be an integrally formed filter screen or a cylinder-shaped filter screen obtained by assembling segmented filter screens. The section of the cylinder-shaped filter screen can be circular, square, etc. The form of the section of the cylinder-shaped filter screen is not specifically limited by the embodiments.

A main unit air inlet is provided on a side door panel assembly 11 of the main unit 10. During the operation of the air purifier, the fan 41 operates to form a depression inside a cavity formed by the filter screen assembly 30. Air from the exterior environment is sucked into the cavity formed by the filter screen assembly 30 through the main unit air inlet on the side door panel assembly 11. During this process, the filter screen assembly 30 absorbs suspended particulate matter from the exterior environment. The air purified by the filter screen assembly 30 then enters the fan air inlet 42 from the cavity and is discharged from the fan air outlet 44 to be eventually discharged into the exterior environment, thus fulfilling the function of air purification. Please refer to the arrows in FIGS. 1 and 9 for the entering and discharging of air.

In the first embodiment as shown in FIGS. 1-8 and the second embodiment as shown in FIGS. 9-17, to ensure the sealing between the filter screen assembly 30 and the fan air inlet 42 (if the sealing is not ensured, air sucked in from the main unit air inlet on the side door panel assembly 11 will enter the fan air inlet 42 without passing through the filter screen assembly, reducing purification efficiency), and to permit the filter screen assembly 30 to be replaced conveniently and rapidly, the base assembly 20 is improved to ensure the sealing and the ease of replacement.

In the embodiment as shown in FIG. 1, the base assembly 20 comprises a carrier part 21 on which the filter screen assembly 30 is provided and a lifting part 22 that is located below the carrier part 21 and abuts the carrier part 21; the lifting part 22 can control the carrier part 21 to descend so as to separate the filter screen assembly 30 from the air supply device 40, and can also control the carrier part 21 to rise so as to achieve a sealed connection between the filter screen assembly 30 and the air supply device 40.

In practice, the lifting part 22 can be all kinds of operable mechanical lifting part. In the present embodiment, the initial status is when the filter screen assembly 30 is sealingly connected with the air supply device 40. When the filter screen assembly 30 needs to be replaced, the lifting part 22 descends, making the carrier part 21 descend. At this moment, the filter screen assembly 30 is separated from the air supply device 40, i.e., there exists a gap between the two, thus facilitating the removal and replacement of the filter screen assembly 30.

When the filter screen assembly 30 needs to be mounted, the filter screen assembly 30 is positioned on the carrier part 21. The lifting part 22 rises, making the carrier part 21 rise. At this moment, the filter screen assembly 30 moves upwards and is sealingly connected with the air supply device 40.

As shown in FIGS. 2 to 7, the lifting part 22 in the base assembly provided by the present embodiment comprises a pull-push part 221 and a screw lifting assembly 222. The pull-push part 221 engages with the screw lifting assembly 222. The screw lifting assembly 222 provided by the present embodiment can move vertically up and down under the action of the pull-push part 221.

In the present embodiment, there can be one or more screw lifting assemblies 222. Optionally, to make sure that the carrier part 21 reaches stress equilibrium, there are 4 screw lifting assemblies 222, i.e., two screw lifting assemblies 222 located on each side of the two opposite sides of the pull-push part 221. The number of the screw lifting assemblies 222 is not specifically limited by the present embodiment.

Specifically, when the pull-push part 221 is pulled outwards, the screw lifting assemblies 222 descends, thus controlling the carrier part 21 to descend; when the pull-push part 221 is pushed inwards, the screw lifting assemblies 222 rises, thus controlling the carrier part 21 to rise.

In other words, the present embodiment transforms the forward-and-backward movement in a horizontal plan of the pull-push part 221, specifically that of the handle 205, into the up-and-down vertical movement of the lifting part 222, thus making the carrier part 21 to move vertically up and down.

The distance S1 of the forward-and-backward movement of the pull-push part 221 is N times the distance S2 of the up-and-own movement of the carrier part 21. Optionally, in the present embodiment, N is larger than 10. Based on the formula of Work W=FS, the work that needs to be overcome in the present embodiment is W1=GS2, G being the weight of the filter screen assembly 30. The present embodiment achieves the rising of the filter screen assembly 30 through doing work to the pull-push part 221, i.e., W2=FS1, and after transformation, F=W2/S1. As W1 is constant, W2 is also constant. Thus, it can be seen that when the greater the distance S1, the smaller the force F. In other words, the present embodiment achieves the objective of reducing the force required in operation.

Optionally, as shown in FIGS. 2 to 5, the screw lifting assembly 222 comprises a gear 223 that engages with the pull-push part 221 and a screw 224 that is provided inside the gear 223 and engages with the gear 223; a screw limiting stopper 211 is provided on the bottom of the carrier part 21, inside the screw 224.

Optionally, the base assembly 20 further comprises an inner cover 23 on which the pull-push part 221 and the screw lifting assembly 222 are provided. A snap 232 and a positioning column 233 are further provided on the inner cover 23; a limiting slot 227 in which the snap 232 engages by snapping is provided on the pull-push part 221; a positioning column 233 around the outside of which the gear 223 is provided is further provided on the inner cover 23.

Figure 7:
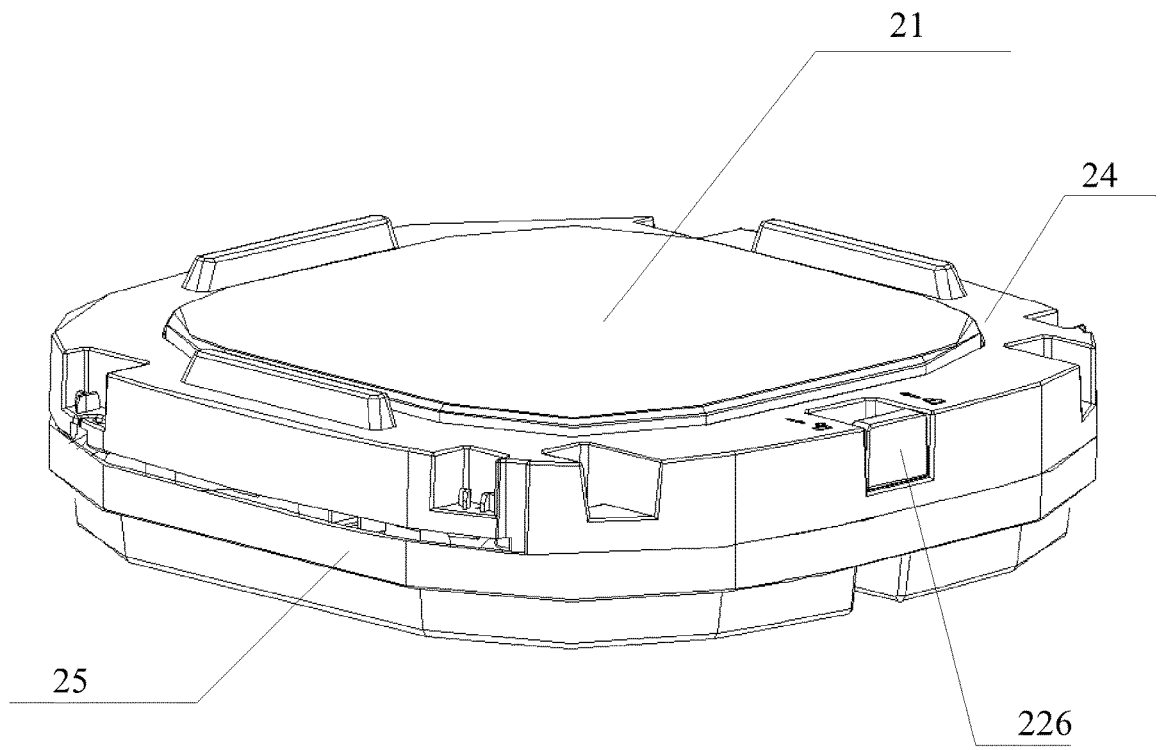
FIG. 7 is another schematic diagram of the base assembly of the air purifier according to the first embodiment of the present disclosure.

To enable the course of rising, the pull-push part 221 is pushed inwards, driving the gear 223 to rotate around the center of the positioning column 233. The screw 224 is driven to move in a synchronized way under the action of inner threads. At this moment, since the screw limiting stopper 211 provided on the bottom of the carrier part 21 limits the rotation of the screw 224, the screw 224 is only able to move upwards vertically. As the carrier part 21 is located above the lifting part 22, when the screw 224 rises, the carrier part 21 will rise in a synchronized way, driving the filter screen assembly 30 to rise in such a manner that, as shown in FIG. 1, a sealing sponge 31 on the filter screen assembly 30 enters into contact with a sealing rib 43 of the fan air inlet 42, achieving the sealing of the air inlet line. The position of the carrier part 21 after the rising is shown in FIG. 7.

Figure 6:
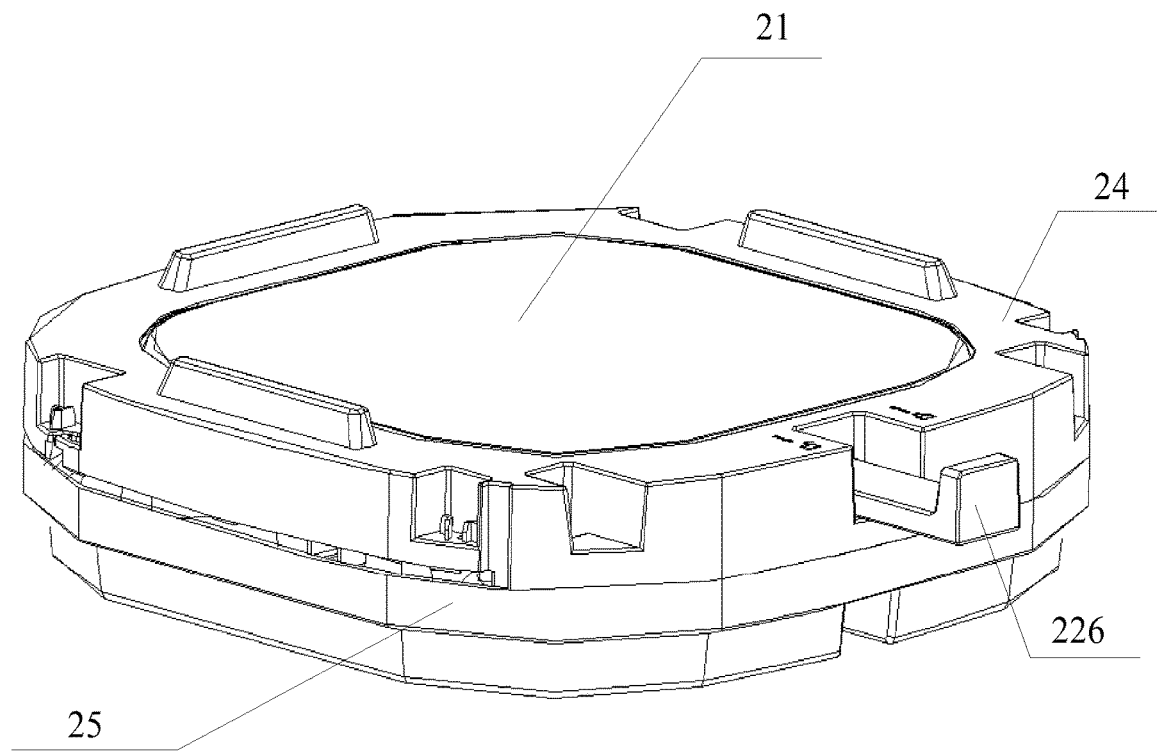
FIG. 6 is a schematic diagram of the base assembly of the air purifier according to the first embodiment of the present disclosure.

To enable the course of descending, the pull-push part 221 is pulled outward, driving the gear 223 to rotate around the center of the positioning column 233. The screw 224 is driven to move in a synchronized way under the action of inner threads. At this moment, since the screw limiting stopper 211 provided on the bottom of the carrier part 21 limits the rotation of the screw 224, the screw 224 is only able to move downwards vertically. The carrier part 21 and the filter screen unit 30 descend at the same time under the action of gravity, achieving the separation of the filter screen assembly 30 from the air supply device 40. The position of the carrier part 21 after the descending is shown in FIG. 6.

During the movement of the pull-push part 221, the snap 232 provided on the inner cover 23 engages by snapping inside the limiting slot 227 provided in the pull-push part 221 and moveable along the snap 232. The snap 232 prevents the pull-push part 221 from separating from the gear 223 during the course of movement. During the course of mounting, after making the snap 232 engage by snapping with the limiting slot 227, the mounting of the pull-push part 221 is achieved.

Figure 4:
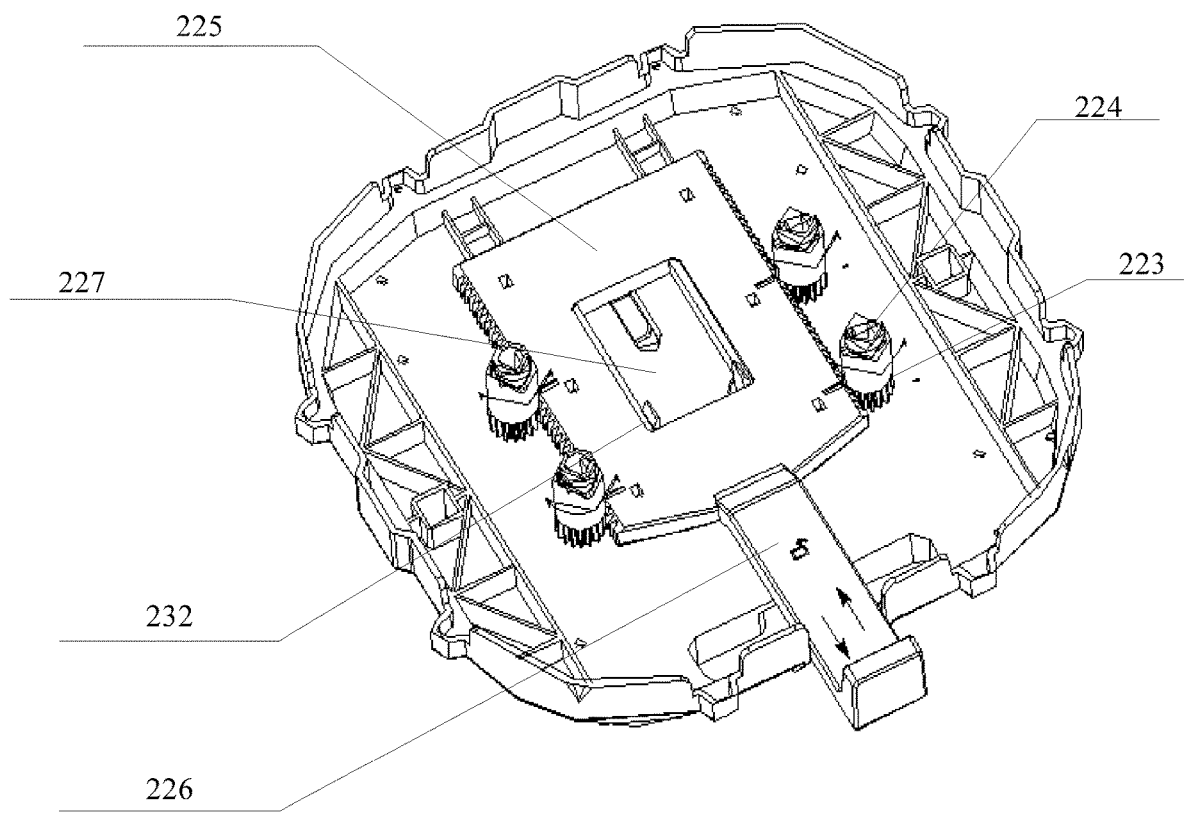
FIG. 4 is a schematic view of the base assembly, in an assembled position, of the air purifier according to the first embodiment of the present disclosure.

Further, as shown in FIG. 4, the snap 232 also has the function of limiting position. When the pull-push part 221 is pushed inwards and when one end of the limiting slot 227 comes to abut the snap 232, the pull-push part 221 can no longer be pushed to move, which means the filter screen assembly 30 is mounted in position. The position of the pull-push part 221 when the filter screen assembly 30 is mounted in position is shown in FIG. 4.

In the present embodiment, by providing a limiting slot and a snap that engages in the limiting slot by snapping and making the limiting slot moveable along the snap, the separation of the pull-push part from the gear during the course of movement is prevented by the snap and the position of the pull-push part when the filter screen assembly is mounted in position can be located, thus facilitating installation by a user.

Figure 2:
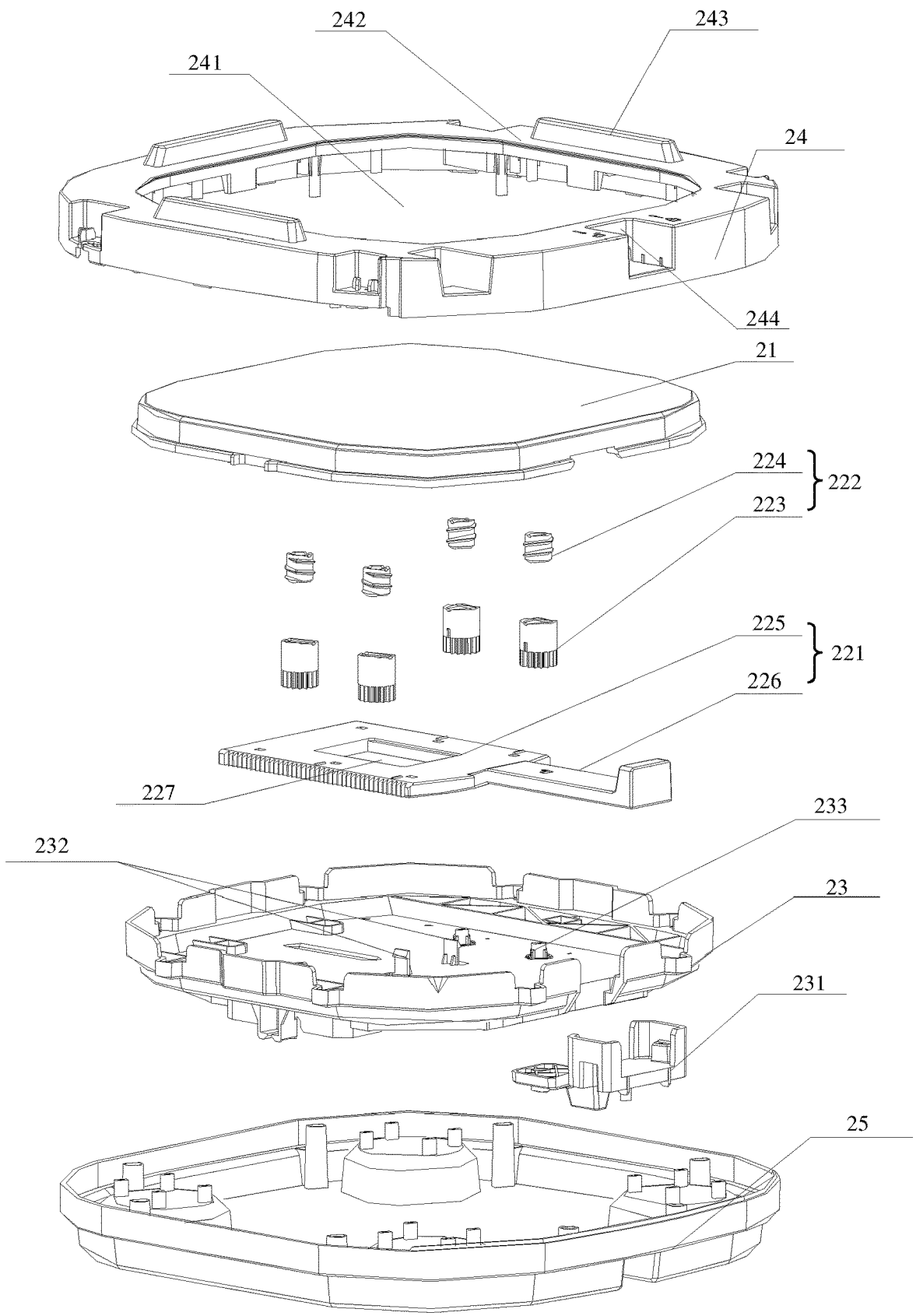
FIG. 2 is an exploded schematic diagram of a base assembly of the air purifier according to the first embodiment of the present disclosure.
Figure 3:
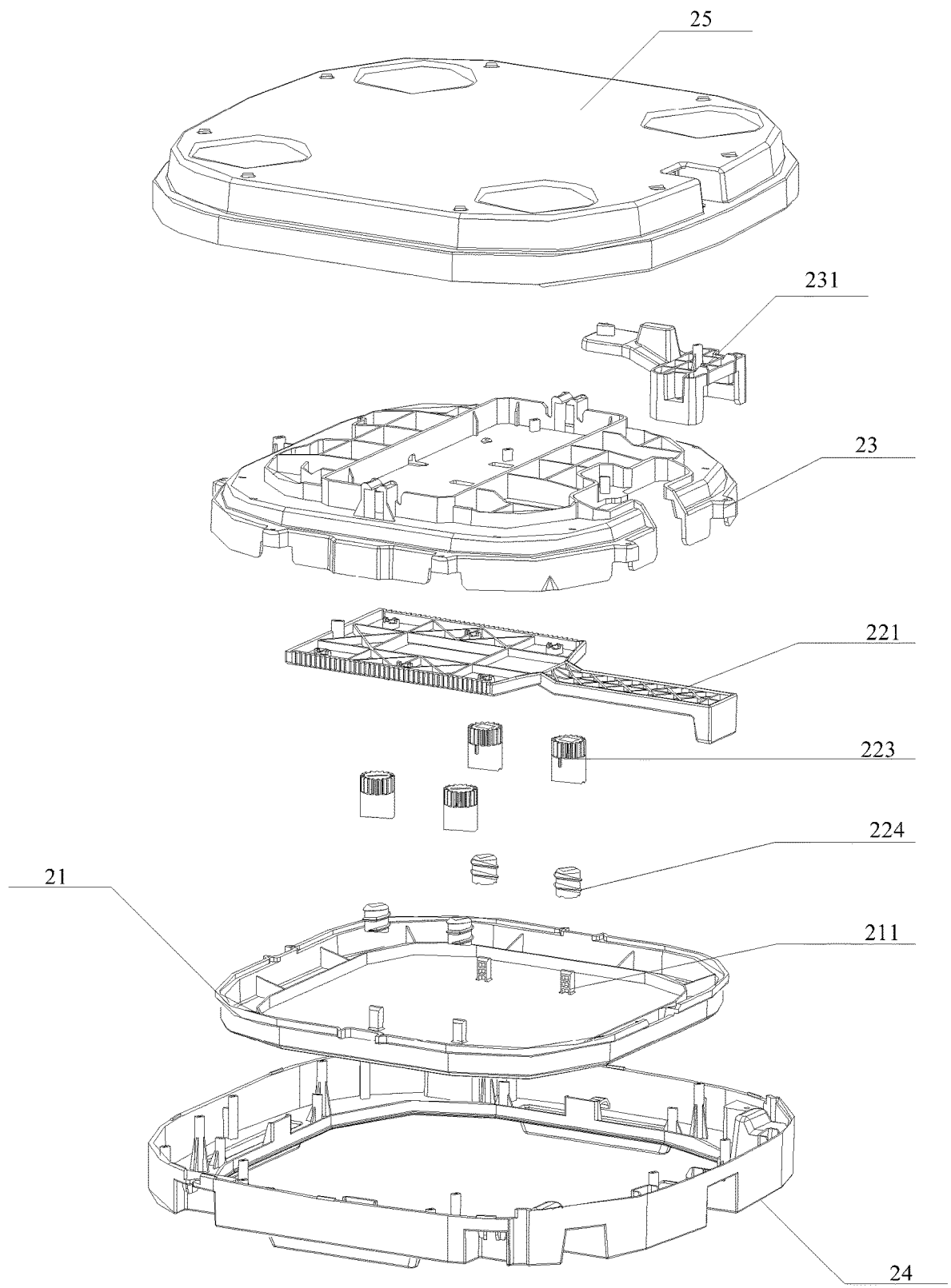
FIG. 3 is another exploded schematic diagram of the base assembly of the air purifier according to the first embodiment of the present disclosure.

Optionally, as shown in FIGS. 2 to 4, a pull-push guiding part 231 inside which at least part of the pull-push part 221 is located is provided on the inner cover 23. The pull-push part 221 is moveable along the pull-push guiding part 231.

In a possible embodiment, the pull-push part 221 comprises a pull-push body 225 and a handle 226. Specially, a handle guiding part is provided inside the pull-push guiding part 231. The handle 226 is located inside the handle guiding part and the pull-push body 225 engages with the screw lifting assembly 222.

In practice, the handle 226 can be operated to achieve the movement of the pull-push guiding part 231. By providing the handle guiding part 231 inside which the handle 226 is located, the problem of unease in operation due to left-and-right swinging of the handle 226 is avoided. Moreover, the handle guiding part 231 also limits the pull-out position of the pull-push part 221. As shown in FIG. 4, when the pull-push body 225 abuts the edge of the handle guiding part 231, the pull-push part 221 can no longer be pulled outwards, avoiding damage that would be caused to the base assembly by blindly pulling.

Optionally, as shown in FIGS. 2, 3, 6 and 7, the base assembly 20 further comprises a base upper cover 24 that has an opening 241 with a flange 242; the bottom end of the carrier part 21 is provided with a turn-up 212 that can abuts the flange 242. Optionally, the inner cover 23 is located inside the base upper cover 24.

When the filter screen assembly 30 is separated from the air supply device 40, the top of the carrier part 21 is located in the same plan as that of the base upper cover 24. When the filter screen assembly 30 is sealingly connected with the air supply device 40, the carrier part 21 protrudes from the opening 241.

In some scenarios of utilization, for example, when the carrier part 21 has risen to a certain height, the turn-up 212 abuts the flange 242, preventing the carrier part 21 from swinging or separating from the screw lifting assembly 222 during the course of utilization.

Optionally, a filter screen limiting stopper 243 is further provided on the base upper cover 24. During the course of rising or descending of the filter screen assembly 30, the filter screen limiting stopper 243 limits the position of the filter screen assembly 30 and prevents the filter screen assembly 30 from changing its position or inclining, thus making sure that the filter screen assembly 30 can be mounted in a correct position and therefore ensuring the sealing between the filter screen assembly 30 and the air supply device 40.

Figure 5:
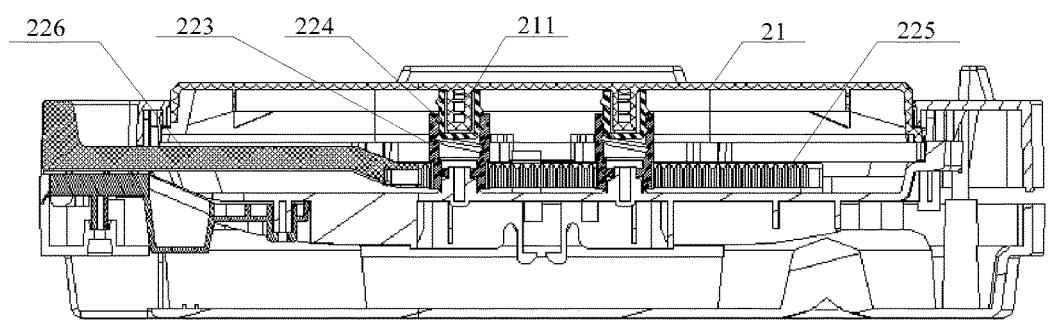
FIG. 5 is a sectional view of the base assembly of the air purifier according to the first embodiment of the present disclosure.

Optionally, the base assembly 20 further comprises a base lower cover 25 that is located below the base upper cover 24. As shown in FIGS. 5 to 7, the base upper cover 24 and the base lower cover 25 form a receiving space inside which the inner cover 23 is located. The base upper cover 24 acts to support and protect the air purifier.

Figure 8:
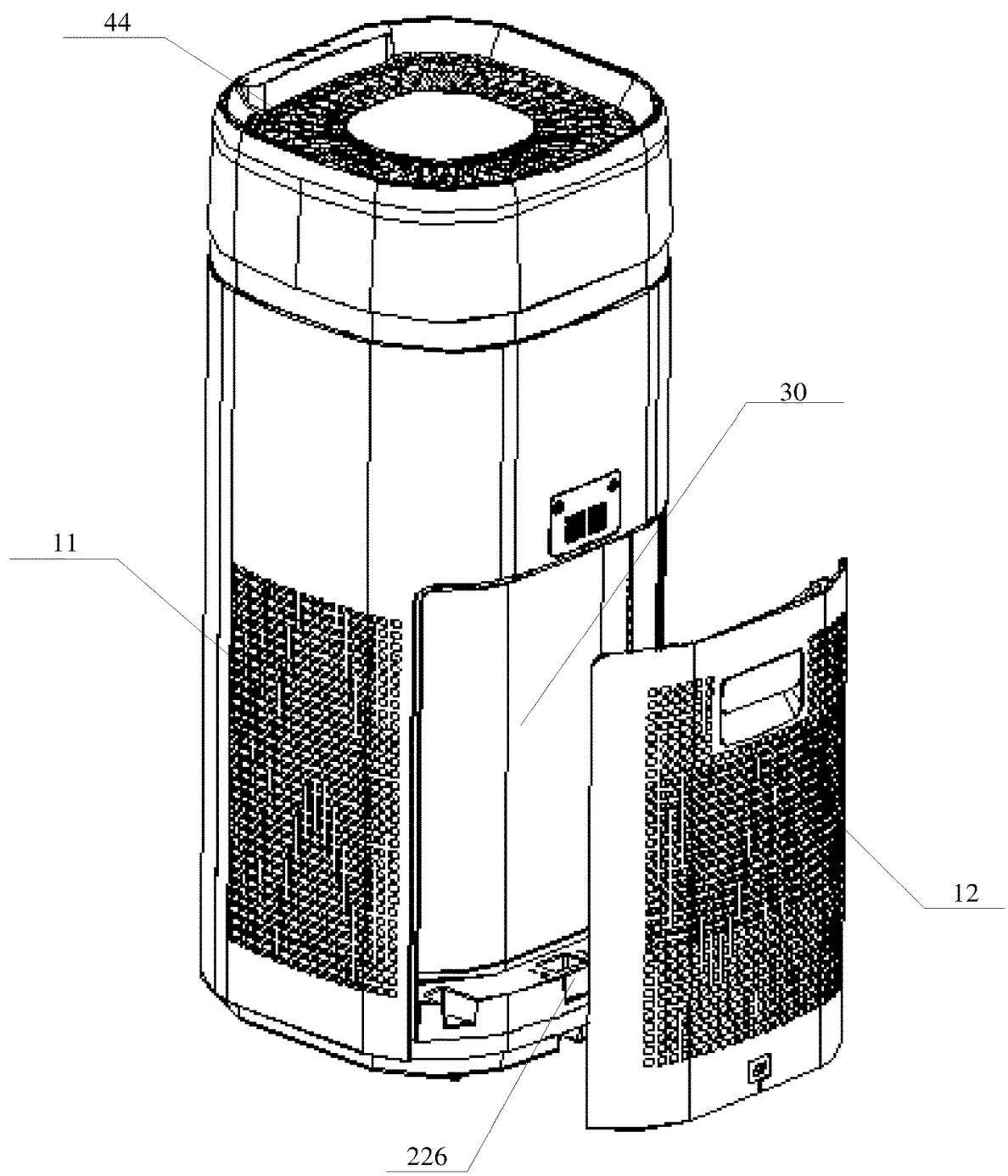
FIG. 8 is a schematic view showing the replacement of a filter screen assembly of the air purifier according to the first embodiment of the present disclosure.

FIG. 8 is a schematic view showing the replacement of the filter screen assembly of the air purifier according to the first embodiment of the present disclosure. With reference to FIGS. 2 and 8, the main unit 10 comprises a side door panel assembly 11 and a rear door panel assembly 12. A large number of main unit air inlets are provided on the side door panel assembly 11 and the rear door panel assembly 12. The filter screen assembly 30 is provided inside the cavity enclosed by the side door panel assembly 11 and the rear door panel assembly 12, which are connected to each other in a dismountable way. The user operable portion of the lifting part 22 is provided at the side of the rear door panel assembly 12. Also, a handle passage hole 244 through which at least part of the pull-push part 221 protrudes is provided in the base upper cover 24. Specifically, the user operable portion can be the above-described handle, which protrudes through the handle passage hole 244

When a user replaces the filter screen assembly 30, the user opens the rear door panel assembly 12, then pull the handle 226 outwards to the position shown in FIG. 6, and removes the filter screen assembly 30. Then, the user positions a new filter screen assembly 30 on the carrier part 21, pushes the handle 226 inwards to the position shown in FIG. 7, and then closes the rear door panel assembly 12.

The structure of the base assembly 20 of the air purifier according to the second embodiment of the present disclosure.

Similarly to the first embodiment described above with reference to FIGS. 1 to 8, the base assembly 20 of the second embodiment also comprise a carrier part 21 on which the filter screen assembly 30 is provided and a lifting part 22' that is located below the carrier part 21 and abuts the carrier part 21. Similarly, the lifting part 22' can control the carrier part 21 to descend so as to separate the filter screen assembly 30 from the air supply device 40, and can also control the carrier part 21 to rise so as to achieve a sealed connection between the filter screen assembly 30 and the air supply device 40.

In this embodiment, the lifting part 22 comprises a pull-push part 221' and a connecting rod assembly 222'2', one end of which is connected with the carrier part 21, and the other end of which is connected with the pull-push part 221'.

The pull-push part 221' can drive the connecting rod assembly 222'2' to move, in order to control the carrier part 21 to descend so as to separate the filter screen assembly 30 from the air supply device 40, and can also drive the connecting rod assembly 222'2' to move, in order to control the carrier part 21 to rise so as to achieve a sealed connection between the filter screen assembly 30 and the air supply device 40. A person skilled in the art can understand that, when the carrier part 21 descends and rises, the connecting rod assembly 222'2' moves in an opposite way.

In practice, the pull-push part 221' can be all kinds of operable mechanical pull-push part, and the connecting rod assembly 222'2' can be all kinds of operable mechanical connecting rod assembly. In the present embodiment, the initial status is when the filter screen assembly 30 is sealingly connected with the air supply device 40. When the filter screen assembly 30 needs to be replaced, the pull-push part 221' is moved. By way of example, the pull-push part 221' is pulled outwards, driving the connecting rod assembly 222'2' to move and causing the carrier part 21 to descend. At this moment, the filter screen assembly 30 is separated from the air supply device 40, i.e., there exists a gap between the two, thus facilitating the removal and replacement of the filter screen assembly 30.

When the filter screen assembly 30 needs to be mounted, the filter screen assembly 30 is positioned on the carrier part 21. The pull-push part 221' is moved. By way of example, the pull-push part 221' is pushed inwards, driving the connecting rod assembly 222'2' to move and causing the carrier part 21 to rise. At this moment, the filter screen assembly 30 moves upwards and is sealingly connected with the air supply device 40.

As shown in FIGS. 10 to 16, the connecting rod assembly 222' in the base assembly provided by the present embodiment comprises a connecting rod 2221', an upper positioning pin 2222', and a lower positioning pin 2223'. Optionally, the bottom of the carrier part 21 is provide with an upper positioning pin slot 211', and the top of the pull-push part 221' is provided with a lower positioning pin slot 227'. The connecting rod assembly 222' is connected with the carrier part 21 and the pull-push part 221' respectively through the upper positioning pin slot 211' and the lower positioning pin slot 227'. Specifically, the upper positioning pin 2222' traverses one end of the connecting rod 2221' and is provided inside the upper positioning pin slot 211'; the lower positioning pin 2223' traverses the other end of the connecting rod 2221' and is provided inside the lower positioning pin slot 227'.

In the present embodiment, there can be one or more connecting rod assemblies 222'. Optionally, to make sure that the carrier part 21 reaches stress equilibrium, there are, for example, 4 connecting rod assemblies 222', i.e., two connecting rod assemblies 222' located on each side of the two opposite sides of the pull-push part 221'. The number of the connecting rod assemblies 222' is not specifically limited by the present embodiment.

In the present embodiment, the upper positioning pin 2222' or the lower positioning pin 2223' can be a structure with a smooth outer surface such as a cylinder. The upper positioning pin 2222' or the lower positioning pin 2223' can also be a cylinder whose diameter is greater in the middle than at the two ends. The specific shape of the upper positioning pin 2222' and the lower positioning pin 2223' is not limited by the present embodiment.

The upper positioning pin slot 211' of the present embodiment can comprise two snapping ears or snapping rings provided symmetrically, so that after the upper positioning pin 2222' traverses one end of the connecting rod assembly 222', the two ends of the upper positioning pin 2222' can respectively be fixed in the snapping ears or snapping rings and will not escape from the upper positioning pin slot 211'. The structure of the upper positioning pin slot 211' is not limited by the present embodiment so long as it can fix the upper positioning pin 2222'. The shape of the lower positioning pin slot 227' can be similar to that of the upper positioning pin slot 211' and is not described further here.

In the present embodiment, the lower positioning pin 2223', when driven by the pull-push part 221', moves, causing the connecting rod 2221' to rotate around the upper positioning pin 2222', thus changing the vertical distance between the carrier part 21 and the pull-push part 221', achieving the rising or descending of the carrier part 21.

Optionally, one end of the connecting rod 2221' is provided with a circular through hole 22211' inside which the upper positioning pin 2222' is provided, and the other end of the connecting rod 2221' is provided with an elongated through hole 22212' inside which the lower positioning pin 2223' is provided.

Figure 13:
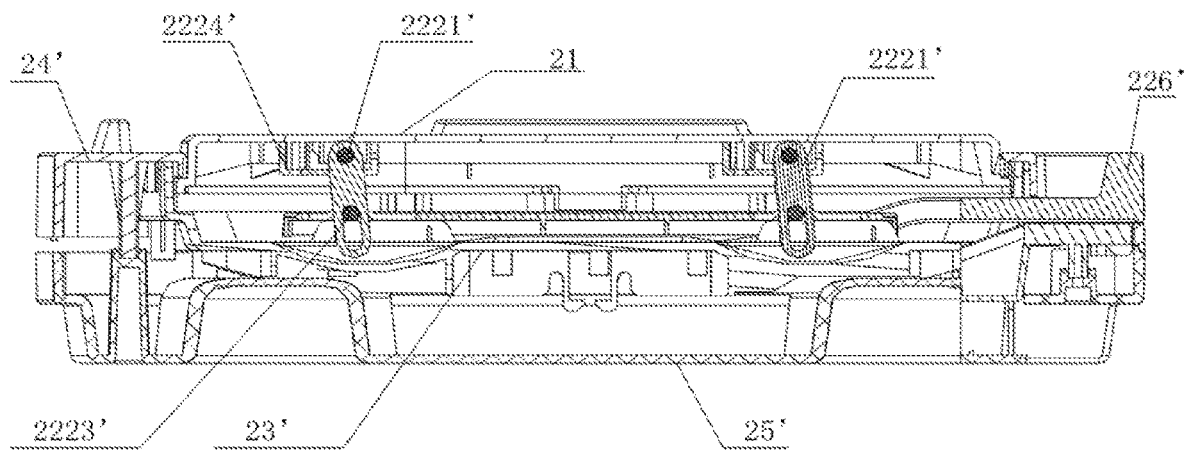
FIG. 13 is a sectional view of the base assembly of the air purifier according to the second embodiment of the present disclosure.
Figure 14:
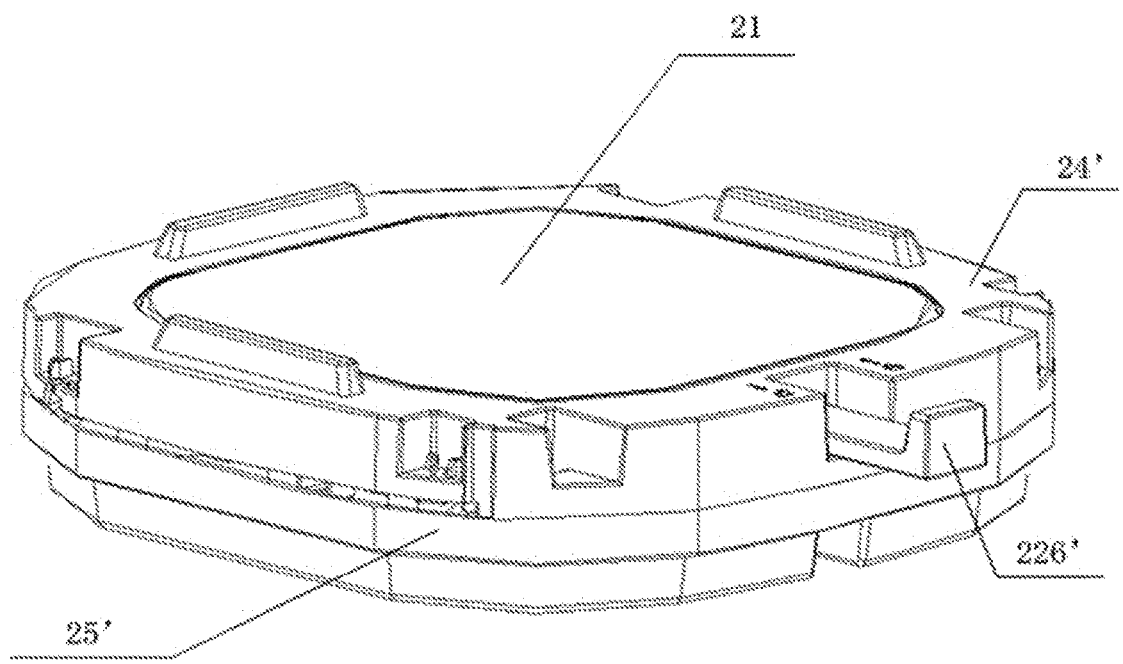
FIG. 14 is a schematic diagram of the base assembly of the air purifier according to the second embodiment of the present disclosure.

FIG. 13 shows an initial status in which the filter screen assembly 30 is sealingly connected with the air supply device 40. At this moment, when the pull-push part 221' is pulled outwards, it drives the lower positioning pin 2223' to move outwards, to the end of the elongated through hole 22212' of the connecting rod 2221' that is close to the pull-push part 221'. During this process, the connecting rod 2221' rotates around the upper positioning pin 2222', and the angle between the connecting rod 2221' and the pull-push part 221' gradually decreases, causing the carrier part 21 to descend, thus achieving the separation of the filter screen assembly 30 from the air supply device 40. The position of the carrier part 21 after the descending is shown in FIG. 14.

Figure 15:
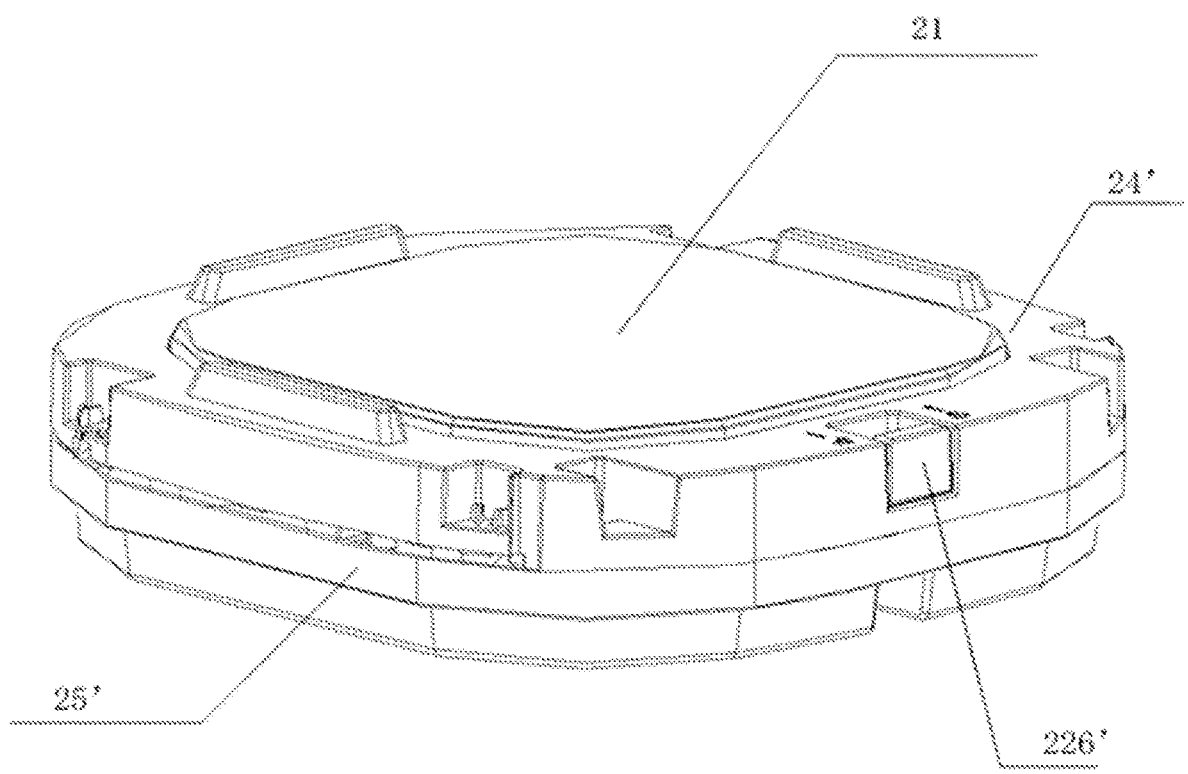
FIG. 15 is another schematic diagram of the base assembly of the air purifier according to the second embodiment of the present disclosure.

When the pull-push part 221' is pushed inwards, it drives the lower positioning pin 2223' to move inwards, to the end of the elongated through hole 22212' of the connecting rod 2221' that is far away from the pull-push part 221'. During this process, the connecting rod 2221' rotates around the upper positioning pin 2222', and the angle between the connecting rod 2221' and the pull-push part 221' gradually increases, causing the carrier part 21 to rise, achieving a sealed connection between the filter screen assembly 30 and the air supply device 40. The position of the carrier part 21 after the rising is shown in FIG. 15.

Figure 10:
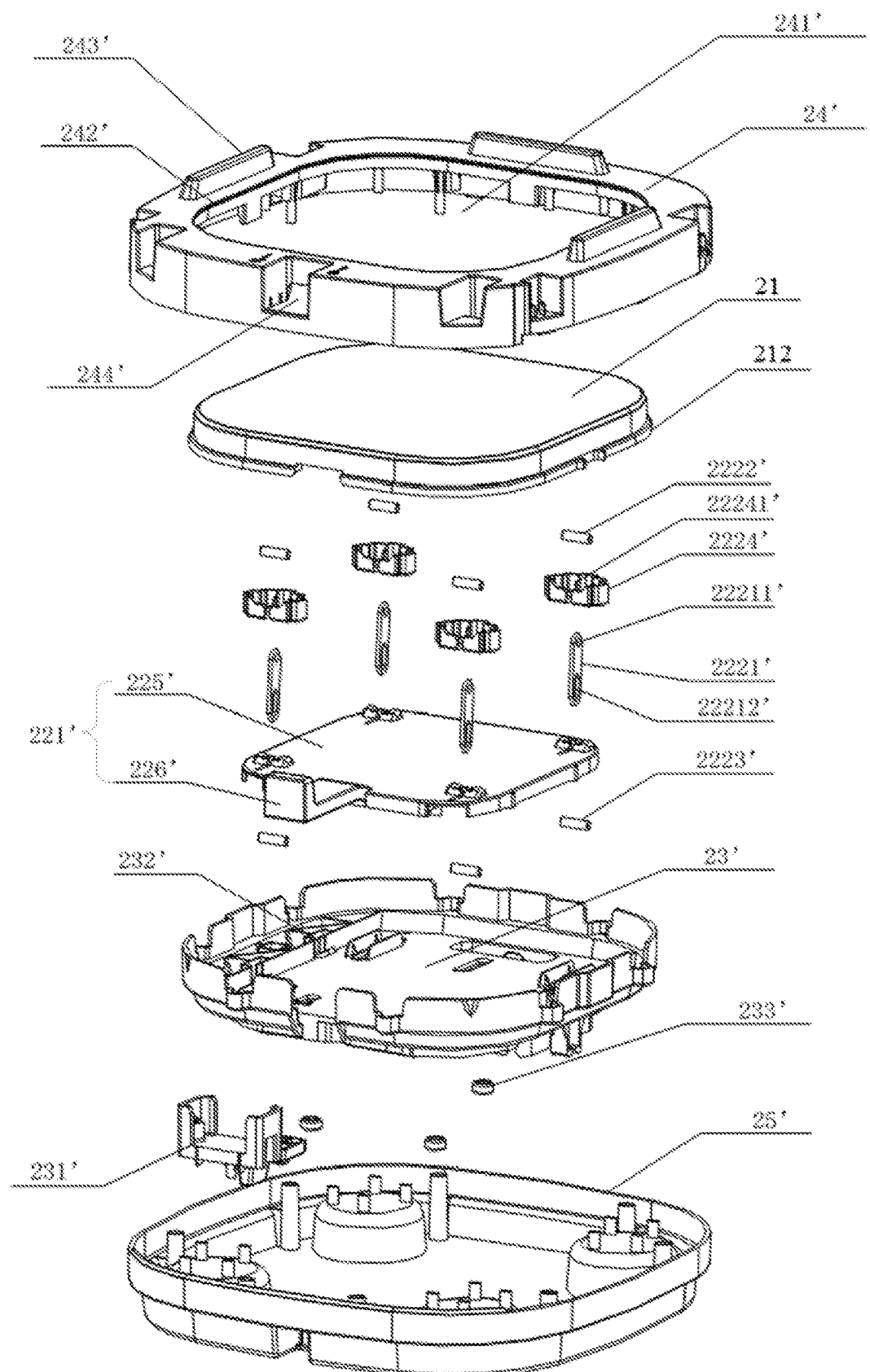
FIG. 10 is an exploded schematic diagram of a base assembly of the air purifier according to the second embodiment of the present disclosure.
Figure 11:
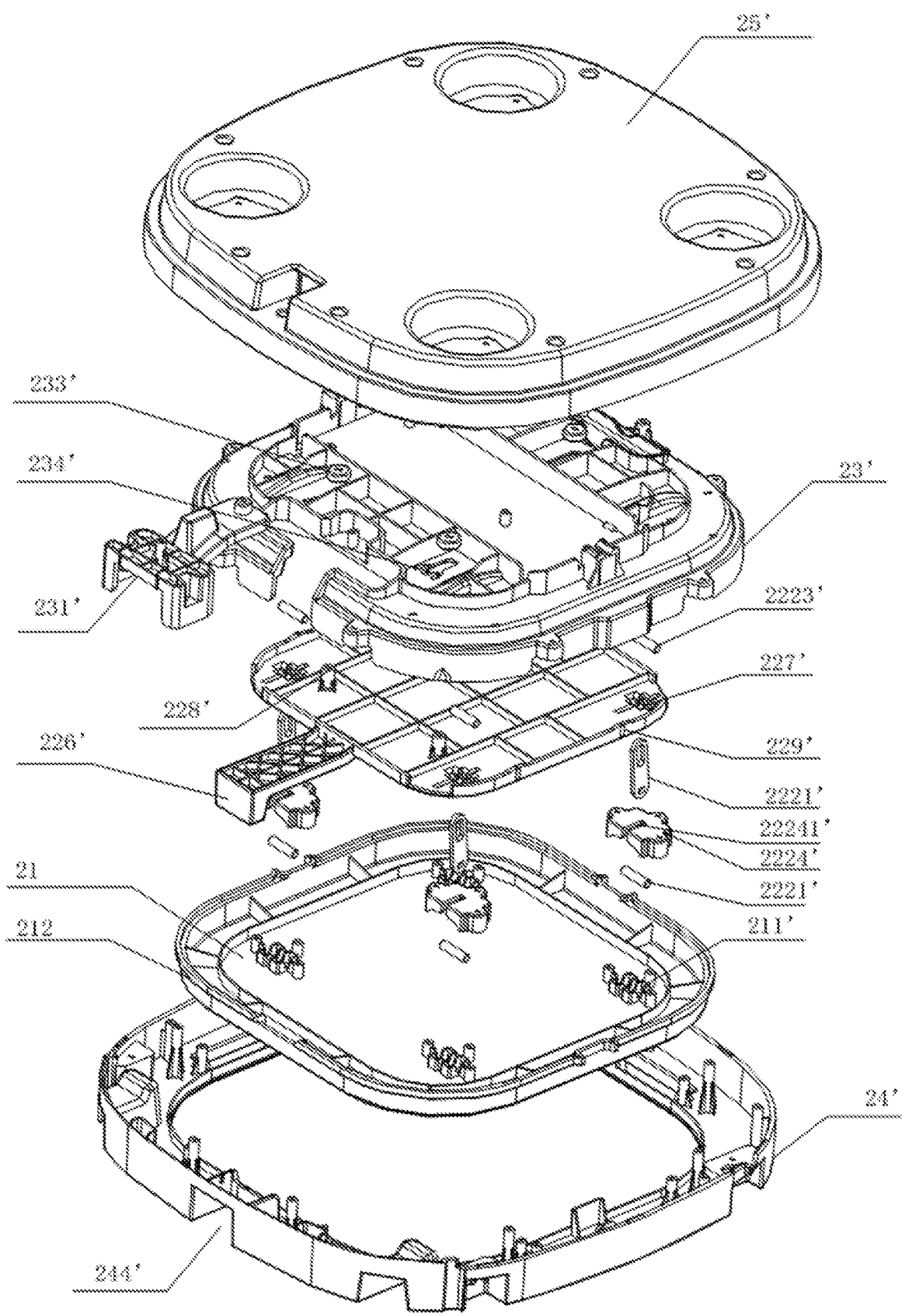
FIG. 11 is another exploded schematic diagram of the base assembly of the air purifier according to the second embodiment of the present disclosure.

Optionally, as shown in FIGS. 10 and 11, the connecting rod assembly 222' further comprises a fixing block 2224' on which a notch 22241' is provided. The fixing block 2224' covers the upper positioning pin slot 2221', and the connecting rod 2221' is provided inside the notch 22241'. The fixing block 2224' can be connected with the carrier part 21 by a screw, and can protect the upper positioning pin 2222' and prevent it from escaping. The notch 22241' can guide the movement direction of the connecting rod 2221', which is inside the notch 22241' when moving. The notch 22241' can prevent an overall deviation of the position of the connecting rod 2221'.

Figure 16:
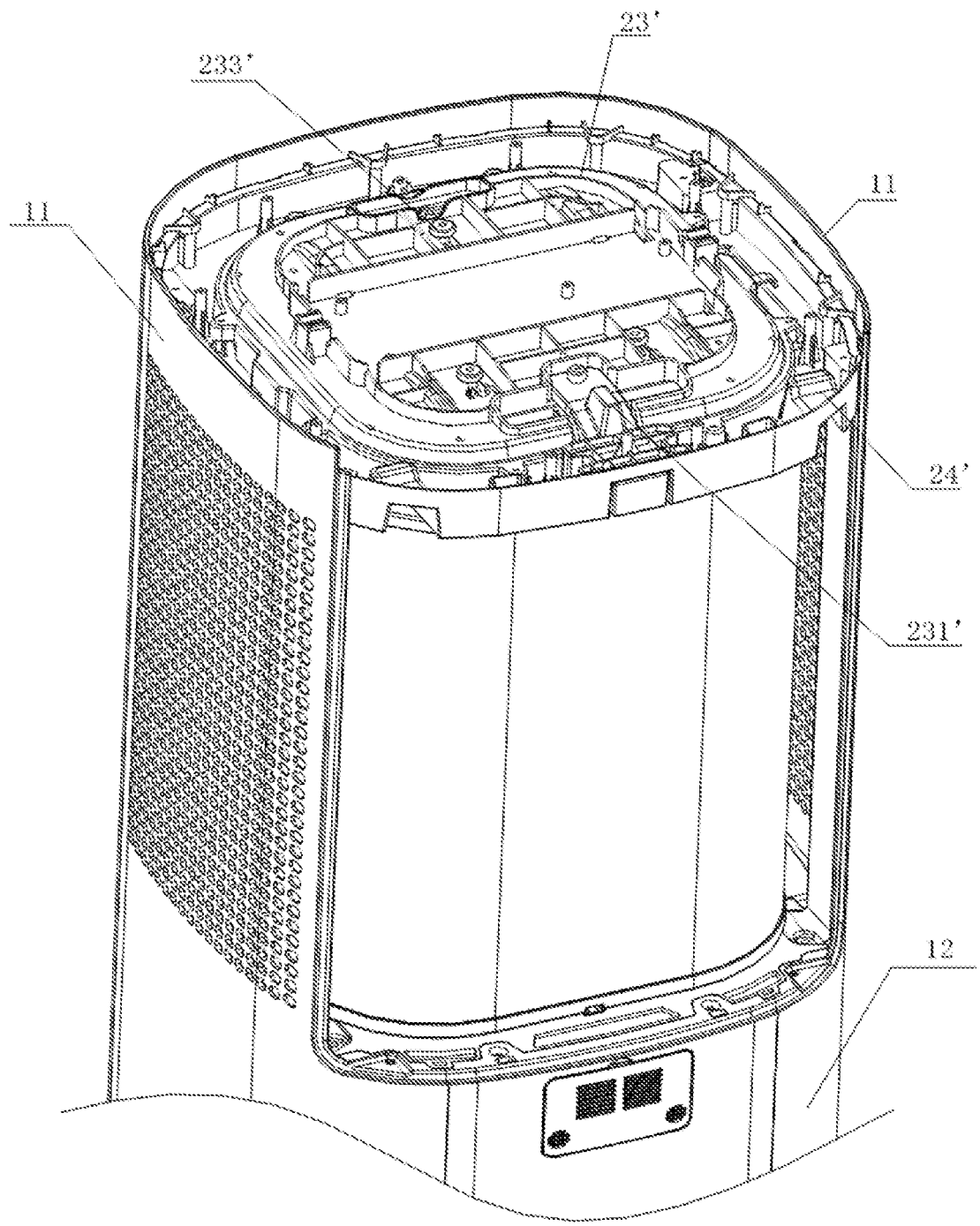
FIG. 16 is yet another schematic diagram of the base assembly of the air purifier according to the second embodiment of the present disclosure.

Optionally, as shown in FIGS. 10, 11, and 16, the base assembly 20 further comprises an inner cover 23' in which a sliding slot 234' is provided. The pull-push part 221' is provided on the inner cover 23', and the bottom of the pull-push part 221' is provided with a thread stud 228' that traverses the sliding slot 234' to be connected with a sliding plate 233', wherein the thread stud 228' is slidable inside the sliding slot 234'.

Optionally, a limiting rib 229' is provided on a side wall of the pull-push part 221', and a limiting snap 232' is provided on the inner cover 23'. When the pull-push part 221' is pushed inwards to the point where the limiting rib 229' engages in the limiting snap 232' by snapping, the carrier part 21 finishes its rising.

During the course of movement of the pull-push part 221', the thread stud 228' slides inside the sliding slot 234', achieving the relative movement between the pull-push part 221' and the inner cover 23'. The sliding slot 234' prevents the pull-push part 221' from escaping from the inner cover 23' during the course of movement. The limiting rib 229' and the limiting snap 232' cooperate, which allows the filter screen assembly 30 to be mounted in position.

Specifically, during the course of pulling the pull-push part 221' outwards, when the thread stud 228' slides to an outer end of the sliding slot 234', the thread stud 228' is stuck at the outer end of the sliding slot 234', and pull-push part 221' arrives in position and can no longer be pulled outwards. At this moment, the carrier part 21 finishes its descending process.

When the pull-push part 221' is pushed inwards and when the carrier part 21 rises to the point where the limiting rib 229' engages inside the limiting snap 232' by snapping, the pull-push part 221' can no longer be pushed. At this moment, the carrier part 21 finishes its rising process. In other words, the filter screen assembly 30 is mounted in position.

In the present embodiment, thanks to the thread stud and the sliding slot which are configured such that when the thread stud is stuck at an outer wall of the sliding slot, the pull-push part can no longer be pulled out, damages caused to the base assembly by blindly pulling are prevented. Thanks to the limiting snap and the limiting rib, the position of the pull-push part when the filter screen assembly is mounted in position can be located, facilitating installation by a user.

Figure 12:
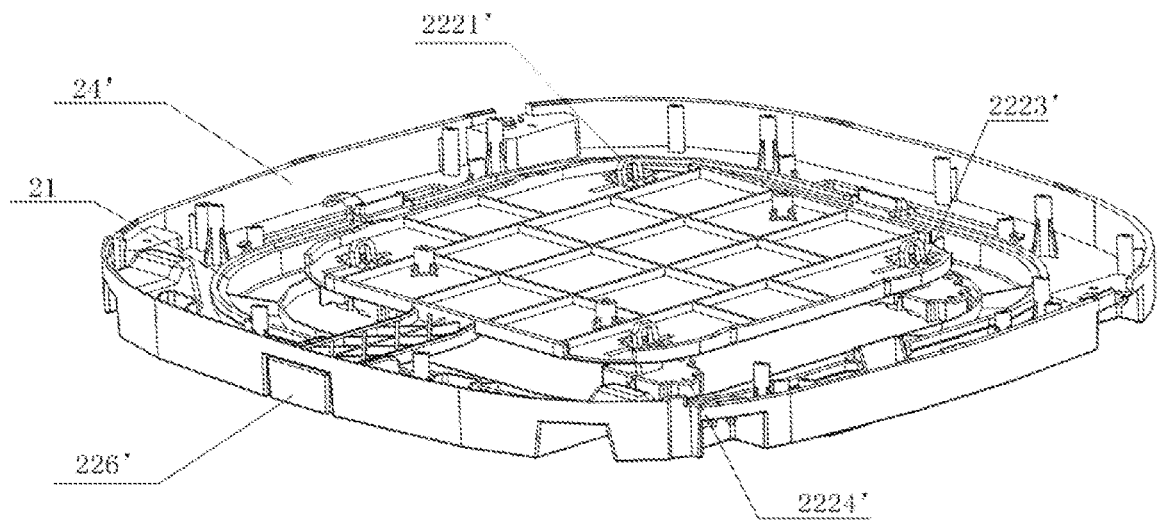
FIG. 12 is a schematic view of the base assembly, in an assembled position, of the air purifier according to the second embodiment of the present disclosure.

Optionally, as shown in FIGS. 10 to 12, a pull-push guiding part 231' inside which at least part of the pull-push part 221' is located is provided on the inner cover 23'. The pull-push part 221' can move along the pull-push guiding part 231'.

In a possible embodiment, the pull-push part 221' comprises a pull-push body 225' and a handle 226'. The handle 226' is located inside the pull-push guiding part 231'.

In practice, the handle 226' can be operated to achieve the movement of the pull-push guiding part 231'. By providing the pull-push guiding part 231' inside which the handle 226' is located, the problem of unease in operation due to the left-and-right swinging of the handle 226' is avoided.

Optionally, as shown in FIGS. 10, 11, 14 and 15, the base assembly 20 further comprises a base upper cover 24' that has an opening 241' with a flange 242'; the bottom of the carrier part 21 is provided with a turn-up 212 that can abut the flange 242'. Optionally, the inner cover 23' is located inside the base upper cover 24'.

When the filter screen assembly 30 is separated from the air supply device 40, the top of the carrier part 21 is located in the same plan as that of the base upper cover 24'. When the filter screen assembly 30 is sealingly connected with the air supply device 40, the carrier part 21 protrudes through the opening 241'.

In some scenarios of utilization, for example, when the carrier part 21 has risen to a certain height, the turn-up 212 abuts the flange 242', preventing the carrier part 21 from swinging during the course of utilization.

Optionally, a filter screen limiting stopper 243' is further provided on the base upper cover 24'. During the course of rising or descending of the filter screen assembly 30, the filter screen limiting stopper 243' can limit the position of the filter screen assembly 30 and prevent the filter screen assembly 30 from changing its position or inclining, thus making sure that the filter screen assembly 30 can be mounted in a correct position and therefore ensuring the sealing between the filter screen assembly 30 and the air supply device 40.

Optionally, the base assembly 20 further comprises a base lower cover 25' that is located below the base upper cover 24'. As shown in FIGS. 13 to 15, the base upper cover 24' and the base lower cover 25' form a receiving space inside which the inner cover 23' is located. The base upper cover 24' acts to support and protect the air purifier.

Figure 17:
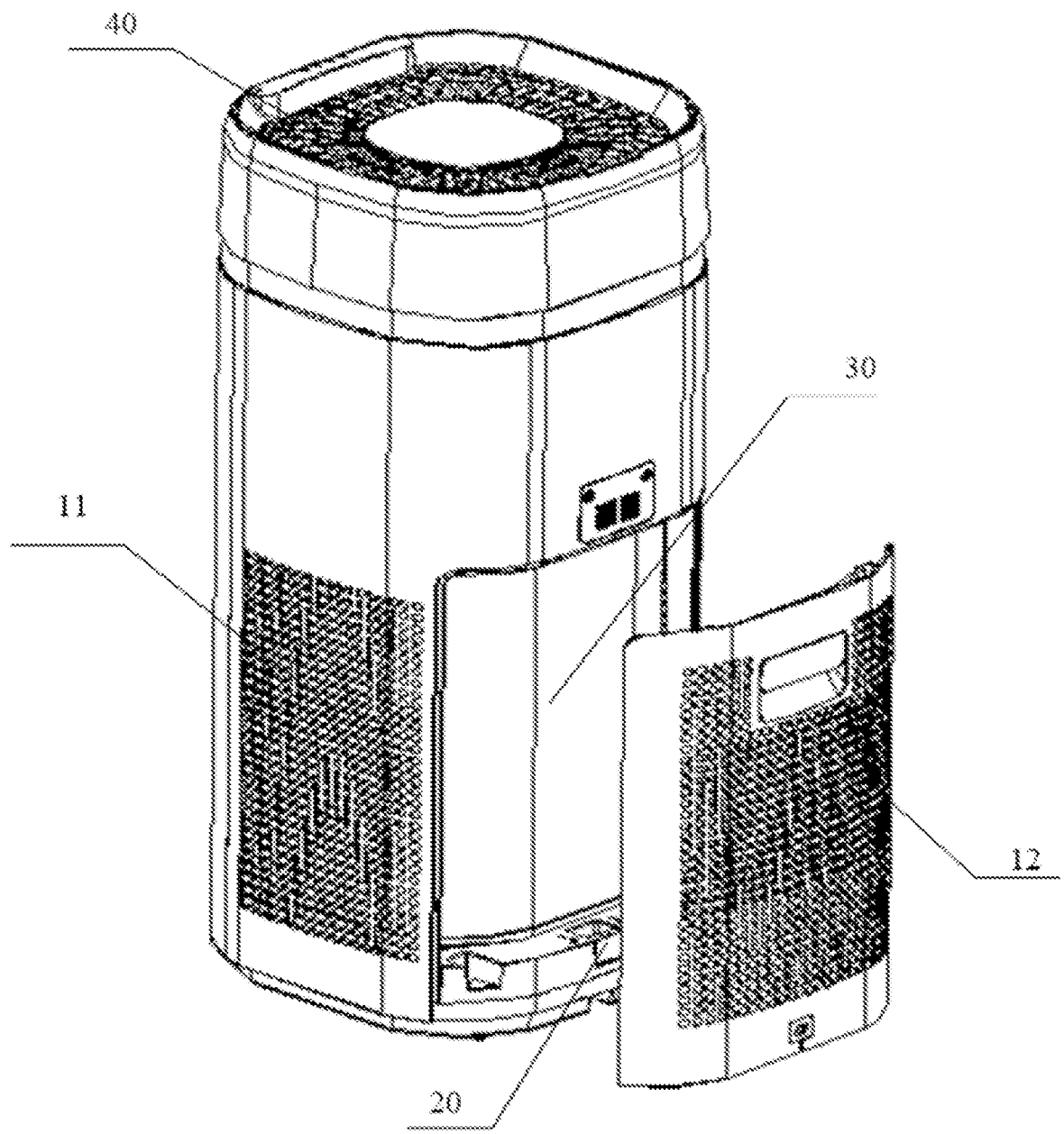
FIG. 17 is a schematic view showing the replacement of a filter screen assembly of the air purifier according to the second embodiment of the present disclosure.

FIG. 17 is a schematic view showing the replacement of the filter screen assembly according to the second embodiment of the present disclosure. The main unit 10 comprises a side door panel assembly 11 and a rear door panel assembly 12. A large number of main unit air inlets are provided on the side door panel assembly 11 and the rear door panel assembly 12. The filter screen assembly 30 is provided inside the cavity enclosed by the side door panel assembly 11 and the rear door panel assembly 12, which are connected in a dismountable way. The user operable portion of pull-push part 221' is provided at the side of the rear door panel assembly 12. Also, a handle passage hole 244' through with at least part of the pull-push part 221' protrudes is provided in the base upper cover 24'. The user operable portion can be specifically the above-described handle 226', which protrudes through the handle passage hole 244'.

When a user replaces the filter screen assembly 30, the user opens the rear door panel assembly 12, then pull the handle 226' outwards to the position shown in FIG. 14, and removes the filter screen assembly 30. Then, the user positions a new filter screen assembly 30 on the carrier part 21, pushes the handle 226' inwards to the position shown in FIG. 15, and then closes the rear door panel assembly 12.

A person skilled in the art can understand that the connection of the above described base upper cover, inner cover, base lower cover, etc. can be realized by snapping, screwing, etc. The connection between the pull-push guiding part and the inner cover can also be realized by screwing. The connection between the above-described side door panel assembly and rear door panel assembly can also be realized by snapping, screwing, etc. The mode of realization of the connection of the different parts in the embodiments can be as shown in the drawings or otherwise, and is not described further here.

In the description, it should be understood that the terms indicating a positional or directional relation such as "upper," "lower," "front," "back," "left," "right," "vertical," "horizontal," "top," "bottom," "inner," "outer," etc. refer to positional or directional relations based on what is shown in the drawings. They are used merely to facilitate and simplify the description, not to indicate or imply the device or element involved must have a specific position/direction and be constructed and operated according to a specific position/direction. Therefore, they should not be understood as limiting the application.

In addition, in the present application, unless otherwise specifically defined and provided, the terms "connect with," "connected with," "fixed," "mounted," etc. should be understood generally. For example, they can be connected mechanically, or can be connected electrically; they can be directly connected, or can be connected through an intermediate medium; they can be internal communication or interaction relationship between two elements. Unless otherwise specifically defined, to a person skilled in the art, they should be understood in the application based on the context.

Finally, it should be noted that: the different embodiments above are used merely to illustrate the technical solution of the present disclosure, not to limit it. While the present disclosure has been described in detail above in connection with the above-described embodiments, a person skilled in the art should understand that he or she can still modify the technical solution described in the above-described embodiments, or to make equivalent replacements to part or all of its technical features, without making the essence of the technical solution fall outside the scope of the technical solution of embodiments of the present disclosure.

The invention claimed is:

1. An air purifier comprising a main unit, a base assembly provided below the main unit, a filter screen assembly provided inside the main unit and an air supply device provided above the filter screen assembly, wherein
   the base assembly comprises a carrier part on which the filter screen assembly is provided and a lifting part that is located below the carrier part and abuts the carrier part,
   the lifting part comprises a pull-push part and a lifting assembly which are configured such that when the pull-push part makes a translation in a first direction, the lifting assembly controls the carrier part to descend so as to separate the filter screen assembly from the air supply device, and when the pull-push part makes a translation in a second direction opposite to the first direction, the lifting assembly controls the carrier part to rise so as to achieve a sealed connection between the filter screen assembly and the air supply device.

2. The air purifier according to claim 1, wherein the lifting assembly is a screw lifting assembly that engages with the pull-push part, the screw lifting assembly and the pull-push part being configured such that
   when the pull-push part is pulled outwards, the screw lifting assembly controls the carrier part to descend;
   when the pull-push part is pushed inwards, the screw lifting assembly controls the carrier part to rise.

3. The air purifier according to claim 2, wherein the screw lifting assembly comprises a gear that engages with the pull-push part and a screw that is provided inside the gear and engages with the gear;
   wherein a screw limiting stopper is provided on a bottom of the carrier part, inside the screw;
   when the pull-push part is pulled outwards, the screw moves downwards so as to make the carrier part descend;
   when the pull-push part is pushed inwards, the screw moves upwards so as to make the carrier part rise.

4. The air purifier according to claim 3, wherein the base assembly further comprises an inner cover on which the pull-push part and the screw lifting assembly are provided.

5. The air purifier according to claim 4, wherein a snap and a positioning column are further provided on the inner cover;
- wherein a limiting slot inside which the snap is engaged by snapping is provided on the pull-push part; and
- wherein a positioning column around an outside of which the gear is provided is further provided on the inner cover.

6. The air purifier according to claim 1, wherein the lifting assembly is a connecting rod assembly an end of which is connected with the carrier part, and the other end of which is connected with the pull-push part, the connecting rod assembly and the pull-push part being configured such that
- when the pull-push part is pulled outwards, the connecting rod assembly controls the carrier part to descend;
- when the pull-push part is pushed inwards, the connecting rod assembly controls the carrier part to rise.

7. The air purifier according to claim 6, wherein the connecting rod assembly comprises a connecting rod, an upper positioning pin and a lower positioning pin;
- wherein a bottom of the carrier part is provided with an upper positioning pin slot, and a top of the pull-push part is provided with a lower positioning pin slot;
- wherein the upper positioning pin traverses one end of the connecting rod and is provided inside the upper positioning pin slot; and
- wherein the lower positioning pin traverses the other end of the connecting rod and is provided inside the lower positioning pin slot.

8. The air purifier according to claim 7, wherein one end of the connecting rod is provided with a circular through hole inside which the upper positioning pin is provided, and the other end of the connecting rod is provided with an elongated through hole inside which the lower positioning pin is provided;
- when the pull-push part is pulled outwards, it drives the lower positioning pin to move to an end of the elongated through hole that is close to the pull-push part, causing the carrier part to descend;
- when the pull-push part is pushed inwards, it drives the lower positioning pin to move to an end of the elongated through hole that is far away from the pull-push part, causing the carrier part to rise.

9. The air purifier according to claim 7, wherein the connecting rod assembly further comprises a fixing block on which a notch is provided; and
- Wherein the fixing block covers the upper positioning pin slot, and the connecting rod is provided inside the notch.

10. The air purifier according to claim 6, wherein the base assembly further comprises: an inner cover on which a sliding slot is provided;
- wherein the pull-push part is provided on the inner cover and a bottom of the pull-push part is provided with a thread stud that traverses the sliding lot to be connected with a sliding plate, wherein the thread stud is slidable inside the sliding slot.

11. The air purifier according to claim 10, wherein a limiting rib is provided on a side wall of the pull-push part and a limiting snap is provided on the inner cover;
- when the pull-push part is pushed inwards to a point where the limiting rib engages in the limiting snap by snapping, the carrier part finishes its rising.

12. The air purifier according to claim 4, wherein a pull-push guiding part is provided on the inner cover and the pull-push part comprises a pull-push body and a handle that is located inside the pull-push guiding part and moveable along the pull-push guiding part.

13. The air purifier according to claim 1, wherein the base assembly further comprises a base upper cover that has an opening with a flange;
- wherein a bottom end of the carrier part is provided with a turn-up which is configured to abut the flange;
- when the filter screen assembly is sealingly connected with the air supply device, the carrier part protrudes through the opening;
- when the filter screen assembly is separated from the air supply device, a top of the carrier part is located in the same plan as that of the base upper cover.

14. The air purifier according to claim 13, wherein a handle passage hole through which at least part of the pull-push part protrudes is provided on the base upper cover.

15. The air purifier according to claim 1, wherein the main unit comprises a side door panel assembly and a rear door panel assembly, the filter screen assembly being provided inside a cavity enclosed by the side door panel assembly and the rear door panel assembly which are connected in a dismountable manner, a user operable portion of the pull-push part being provided at the side of the rear door panel assembly.

* * * * *